(12) United States Patent
Fink et al.

(10) Patent No.: US 11,153,483 B2
(45) Date of Patent: Oct. 19, 2021

(54) SHELF-VIEWING CAMERA WITH MULTIPLE FOCUS DEPTHS

(71) Applicant: Bossa Nova Robotics IP, Inc., Pittsburgh, PA (US)

(72) Inventors: Alexander Fink, Austin, TX (US); Garrick Kremesec, San Francisco, CA (US); Matthew Brekken, Redwood City, CA (US); Sarjoun Skaff, Pittsburgh, PA (US)

(73) Assignee: Bossa Nova Robotics IP, Inc., Pittsburgh, PA (US)

( * ) Notice: Subject to any disclaimer, the term of this patent is extended or adjusted under 35 U.S.C. 154(b) by 0 days.

(21) Appl. No.: 16/549,832

(22) Filed: Aug. 23, 2019

(65) Prior Publication Data

US 2020/0068126 A1   Feb. 27, 2020

Related U.S. Application Data

(60) Provisional application No. 62/722,554, filed on Aug. 24, 2018.

(51) Int. Cl.
| | |
|---|---|
| *H04N 5/232* | (2006.01) |
| *H04N 5/265* | (2006.01) |
| *H04N 5/225* | (2006.01) |
| *G06K 7/14* | (2006.01) |
| *G05D 1/00* | (2006.01) |
| *G06T 7/70* | (2017.01) |

(52) U.S. Cl.
CPC ....... *H04N 5/23238* (2013.01); *G05D 1/0094* (2013.01); *G06K 7/1413* (2013.01); *G06K 7/1443* (2013.01); *G06T 7/70* (2017.01); *H04N 5/2253* (2013.01); *H04N 5/23299* (2018.08); *H04N 5/232125* (2018.08); *H04N 5/265* (2013.01); *G05D 2201/0207* (2013.01)

(58) Field of Classification Search
CPC ......... H04N 5/23238; H04N 5/232125; H04N 5/23299; G06T 7/70; G06K 7/1413; G06K 7/1443; G05D 1/0094
See application file for complete search history.

(56) References Cited

U.S. PATENT DOCUMENTS

| | | | |
|---|---|---|---|
| 10,027,879 B2 * | 7/2018 | Passarella | ................. G06T 7/70 |
| 2005/0067494 A1 * | 3/2005 | Ito | ...................... G06K 7/10683 |
| | | | 235/454 |
| 2007/0109398 A1 * | 5/2007 | Teo | ..................... H04N 5/23238 |
| | | | 348/36 |
| 2009/0121017 A1 | 5/2009 | Cato | |
| 2011/0123188 A1 * | 5/2011 | Cardwell | ................ F16M 11/18 |
| | | | 396/428 |
| 2012/0248192 A1 * | 10/2012 | Tanimoto | ............ G06K 7/10722 |
| | | | 235/462.24 |
| 2013/0161399 A1 | 6/2013 | He | |
| 2017/0286773 A1 * | 10/2017 | Skaff | ......................... G06K 9/46 |

(Continued)

*Primary Examiner* — Jonathan R Messmore
(74) *Attorney, Agent, or Firm* — David R. Stevens; Stevens Law Group (57) ABSTRACT

A method for monitoring a shelf includes the steps of moving a camera with multiple focus capability alongside a shelf. A series of shelf images are captured by the camera, with images of at least two different focal lengths being captured. Images having the same focal length can be merged to form at least two panoramic images suitable for further evaluation or review.

20 Claims, 5 Drawing Sheets

(56) References Cited

U.S. PATENT DOCUMENTS

| | | | |
|---|---|---|---|
| 2018/0005176 A1* | 1/2018 | Williams | G06Q 10/08 |
| 2018/0107999 A1* | 4/2018 | Rizzolo | G06T 7/73 |
| 2018/0108134 A1* | 4/2018 | Venable | G06T 7/521 |
| 2019/0034864 A1* | 1/2019 | Skaff | H04N 5/23238 |
| 2019/0243998 A1* | 8/2019 | Ford | G06K 7/10722 |

* cited by examiner

SHELF-VIEWING CAMERA WITH MULTIPLE FOCUS DEPTHS

CROSS-REFERENCE TO RELATED APPLICATIONS

This application claims priority to U.S. Provisional Patent Application Ser. No. 62/722,554 filed Aug. 24, 2018 titled "Shelf-Viewing Camera With Multiple Focus Depths," which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application

FIELD OF THE INVENTION

This invention relates generally to a multiple camera sensor suite capable of accurately monitoring retail or warehouse shelf space. In certain embodiments, the multiple camera sensor suite can be mounted on an autonomous robot and include cameras with focus stacking capability to allow for photographic capture of shelf identifiers and supported objects.

BACKGROUND

Optical systems with fixed-focus lens systems are often limited by achievable depth of field (i.e. the range of distances from the camera within which objects appear in focus). This depth of field problem becomes particularly acute in "macro" photography involving life size or magnified photographic capture of small objects. For example, shelf-scanning camera systems can have great difficulty in photographing objects or barcodes on a supermarket shelf. A camera attempting to take a macro photograph can be positioned close to the shelf it attempts to scan, but even so the depth of the shelf makes it impossible to achieve a sharp and clearly focused image with a fixed-focus camera.

One solution to depth of field limitations has been the use of auto-focus cameras, i.e. the combination of an auto-focus algorithm and a motorized lens capable of changing its focus depth on demand. This solution works well when the algorithm can determine the correct focus distance for each frame, but it fails in scenarios where all depths may be of equal importance. This limits use of autofocus cameras when product labels or barcodes can be positioned at the front or the back of a supermarket shelf.

Another possible solution for depth of field limitations is focus stacking, where the same frame is captured multiple times with the camera set to different focus depths, and the results are combined using a complex algorithm into a single frame where each object is selected from the source frame in which it is in the best focus. Unfortunately, this method can be) computationally intensive, b) require the camera to be stationary to capture the exact same field of view multiple times, and c) can result in distortions since the algorithm does not know where a specific object begins or ends. If the object is a barcode, such distortions may render the barcode unreadable.

SUMMARY

According to one embodiment, a method for monitoring a shelf includes the steps of moving a camera with multiple focus capability alongside a shelf. A series of shelf images are captured by the camera, with images of at least two different focal lengths being captured. Images having the same focal length can be optionally merged to form at least two panoramic images suitable for further evaluation or review.

In some embodiments the camera can be mounted on an autonomous robot.

In another embodiment, a first focal length image is captured and a second focal length image is captured, repeatedly along a length of a shelf.

In another embodiment a captured shelf image includes a label such as a bar code, symbol, text, or price. The label can be read from the image in best focus.

In another embodiment, frequency of image capture for consecutive images at the same focal depth can be set sufficient to ensure overlap over a region larger than the length of label.

In another embodiment, a method for photographically monitoring a shelf includes the steps of moving a camera with multiple focus capability alongside a shelf and periodically capturing a series of shelf images. Images of at least two different focal lengths can be captured at a frequency sufficient to allow merging of images having the same focal length into a panorama.

BRIEF DESCRIPTION OF THE DRAWINGS

The specific features, aspects and advantages of the present invention will become better understood with regard to the following description and accompanying drawings where.

DETAILED DESCRIPTION

Figure 1:
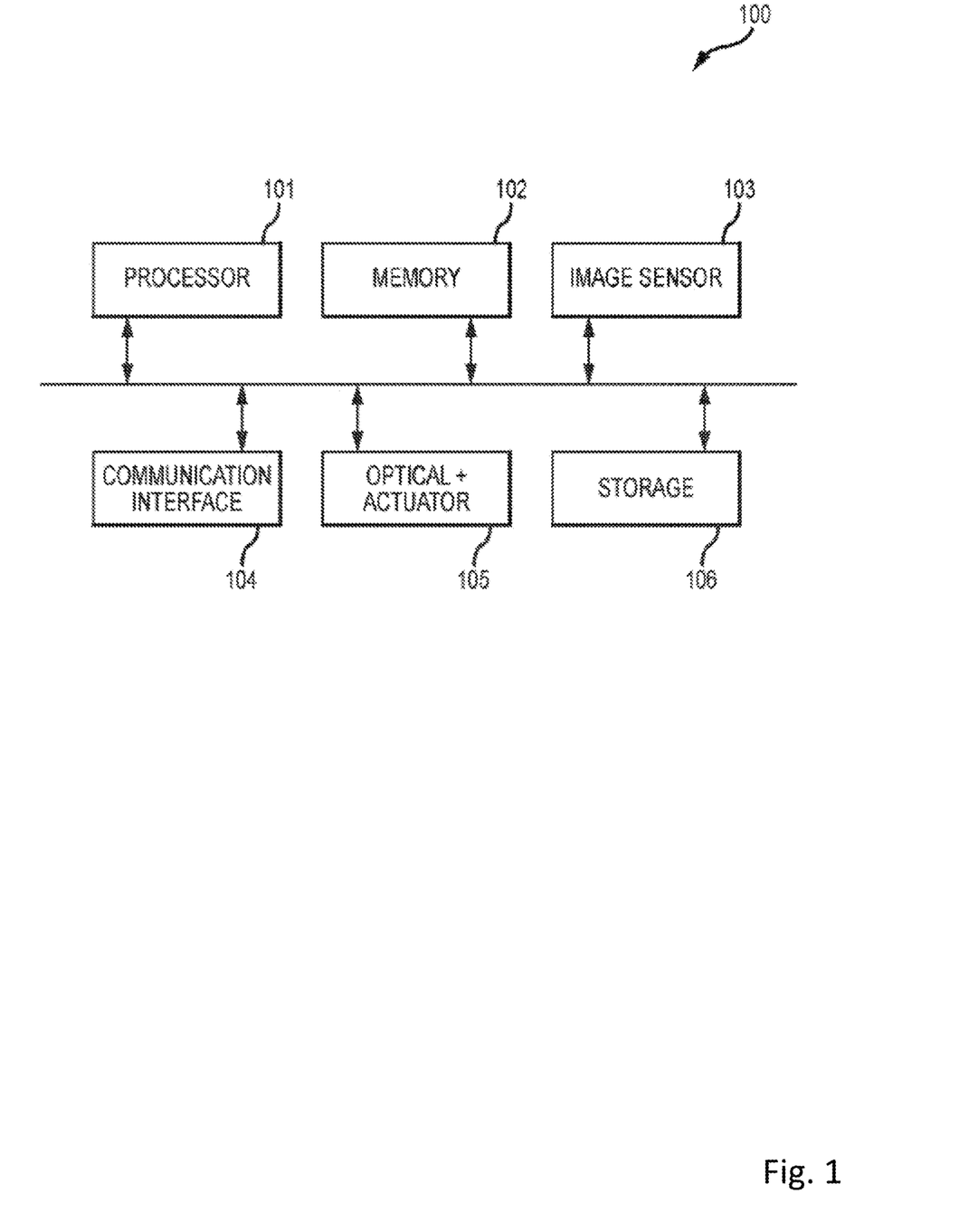
FIG. 1 illustrates a camera system.

As seen in FIG. 1, a movably mounted camera system 100 that can be used to implement the disclosed system and method can be an "IP camera" (i.e., a camera capable of communicate using the Internet Protocol), a USB camera (i.e., a camera having a Universal Serial Bus interface), or a camera capable of communicating with another device by any suitable means. As shown in FIG. 1, camera 100 includes processor 101, memory 102, image sensor 103, communication interfaces 104, camera optical and actuator system 105, and storage 106. Processor 101 controls the overall operations of the camera, such as operating camera optical and actuator system 105, and communication interfaces 104. Camera optical and actuator system 105 controls the operations of the camera, such as exposure control for image captured at image sensor 103. Camera optical and actuator system 105 may include an adjustable lens system (e.g., zoom and automatic focusing capabilities). Camera can be fixedly or movably mounted to point downwardly or upwardly. In certain embodiments a wide field or fish-eye camera can be used. Alternatively, a narrow field, zoomable telephoto camera or a high resolution, tilt controllable, height adjustable camera can be used.

In some embodiments, camera optical and actuator system 105 may include or be associated with an infrared (IR) illumination system (e.g., IR light from light-emitting diodes (LED)) or any suitable illumination system for supplementing light when an environment does not provide sufficient illumination (e.g., at night)). In certain embodiments multiple cameras and/or LEDs can be used to reduce glare from highly reflective surfaces, since multiple cameras pointed in slightly different directions can result in at least one image with little or no glare. Lights can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), phosphor supported white LEDs, halogen lamps or another suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both cameras and lights can be movably mounted. For example, hinged, rail, electromagnetic piston, or other suitable actuating mechanisms used to programmatically rotate, elevate, depress, oscillate, or laterally or vertically reposition cameras or lights. In some embodiments, movable or fixedly mounted cameras can be mounted on an autonomous robot having a navigation and object sensing suite that is capable of independently navigating and moving throughout a building. The autonomous robot can have multiple cameras attached to movable base by a vertically extending camera support. Lights can be positioned to direct light toward shelf or another target. The object sensing suite of the autonomous robot can include forward, side, top and/or rear image and depth sensors to aid in navigation or object (e.g. shelf) detection and localization. Additional sensors such as laser ranging systems can also form a part of the sensor suite that is useful for accurate distance determination for the autonomous robot. In certain embodiments, image sensors can be depth sensors that infer depth from stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

Image sensor 103 captures images under control of processor 101 from light from the environment entering camera 100. The camera is capable of capturing the images from the environment. Sensor 103 may provide a color image or a gray-scale image. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum to reduce energy consumption and motion blur.

Communication interfaces 104 typically include one or more communication interfaces (e.g., a network interface, a USB interface) which allows image data to be transferred from storage 106 to a communicating external device (e.g., a computer). Storage 106 provides non-volatile storage (e.g., archived images and software). Memory 102 provides runtime memory support for processor 101, such as frame buffers for image processing operations According to one embodiment of the present invention, memory 102 may be allocated to include multiple memory spaces such as a manufacturer's memory space, a developer's memory space, and a user memory space. The manufacturer's memory space may be provided with system software provided by the camera manufacturers, such as firmware for operating camera system 100. The user memory space may be used, for example, for allocating frame buffers for image processing. Frame buffers are typically allocated for holding image data captured by image sensor 103. Such image data may include, for example, frame buffers holding consecutive frames of images. The developer's memory space may be used, for example, for holding software modules executed by processor 101 for carrying out a system or a method of image processing.

Figure 2:
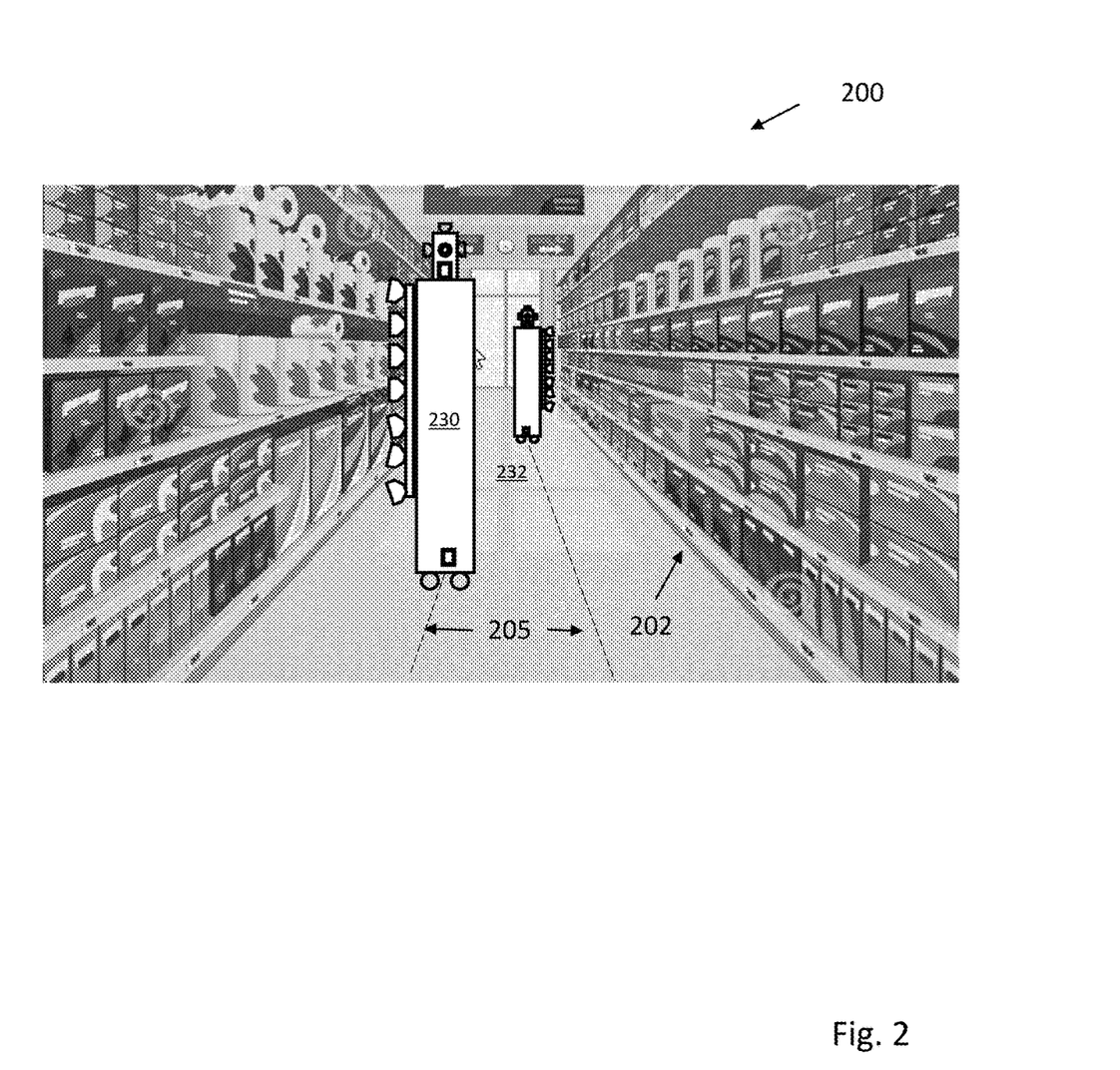
FIG. 2 illustrates a camera moved alongside a shelf by an autonomous robot.

FIG. 2 is a cartoon 200 illustrating two autonomous robots 230 and 232, inspecting opposite shelves 202 in an aisle. As shown each robot follows path 205 along the length of an aisle, with multiple cameras capturing images of the shelves 202. In some embodiments, the robots 230 and 232 support at least one range finding sensor to measure distance between the multiple cameras and the shelves and products on shelves, with an accuracy of less than 5 cm, and with a typical accuracy range between about 5 cm and 1 mm. As will be appreciated, LIDAR or other range sensing instruments with similar accuracy can also be used in selected applications. Using absolute location sensors, relative distance measurements to the shelves, triangulation to a known landmark, conventional simultaneous localization and mapping (SLAM) methodologies, or relying on beacons positioned at known locations in a blueprint or a previously built map, the robots 230 and 232 can move along a path generally parallel to shelves 202. As the robots move, vertically positioned cameras are synchronized to simultaneously capture images of the shelves 202. In certain embodiments, a depth map of the shelves and products is created by measuring distances from the shelf cameras to the shelves and products over the length of the shelving unit using image depth sensors and or laser ranging instrumentation. The depth map is registered onto the images captured by the shelf cameras, so as the location of each pixel on target can be estimated in 3D. Using available information, consecutive images can be stitched together to create panoramic images that spans an entire shelving unit. The consecutive images can be first stitched vertically among all the cameras, and then horizontally and incrementally stitched with each new consecutive set of vertical images as the robots 230 and 232 move along an aisle.

According to one embodiment, cameras such as described with respect to FIG. 1 can be mounted on an autonomous robot such as described with respect to FIG. 2. The autonomous robot is movable alongside a shelf and can be operated to capture multiple focus stackable photographs. In some embodiments, combined or panoramic views having differing focal distances can be captured. In one embodiment the robot can include multiple cameras (each with a lens, sensor and processor) stacked vertically and facing a supermarket shelf. The robot can be set to move laterally beside the shelf at a constant speed, maintaining a constant distance from the shelf, e.g. 20 centimeters. The depth of the shelf can be much larger than this distance, e.g. 56-90 centimeters, a distance too large for a fixed-focus camera to capture the entire depth of the shelf with all objects being in adequate focus.

The processor of each camera can instruct a lens to cycle between three focus positions, each covering a portion of the shelf depth, e.g. position 1 may cover the front 7 centimeters, position 2 may cover the middle 18 centimeters, and position 3 may cover the back 28 centimeters, together providing effective coverage for the entire shelf depth of 56 centimeters.

All the images are captured in slightly different positions in the horizontal domain (since the robot moves constantly to the right), but the frames can be captured fast enough that there is sufficient overlap for a complete panorama to be created at each of the three focus depths (in effect, each object appears in at least three images, ensuring that it is in adequate focus in at least one of the images).

Figure 3:
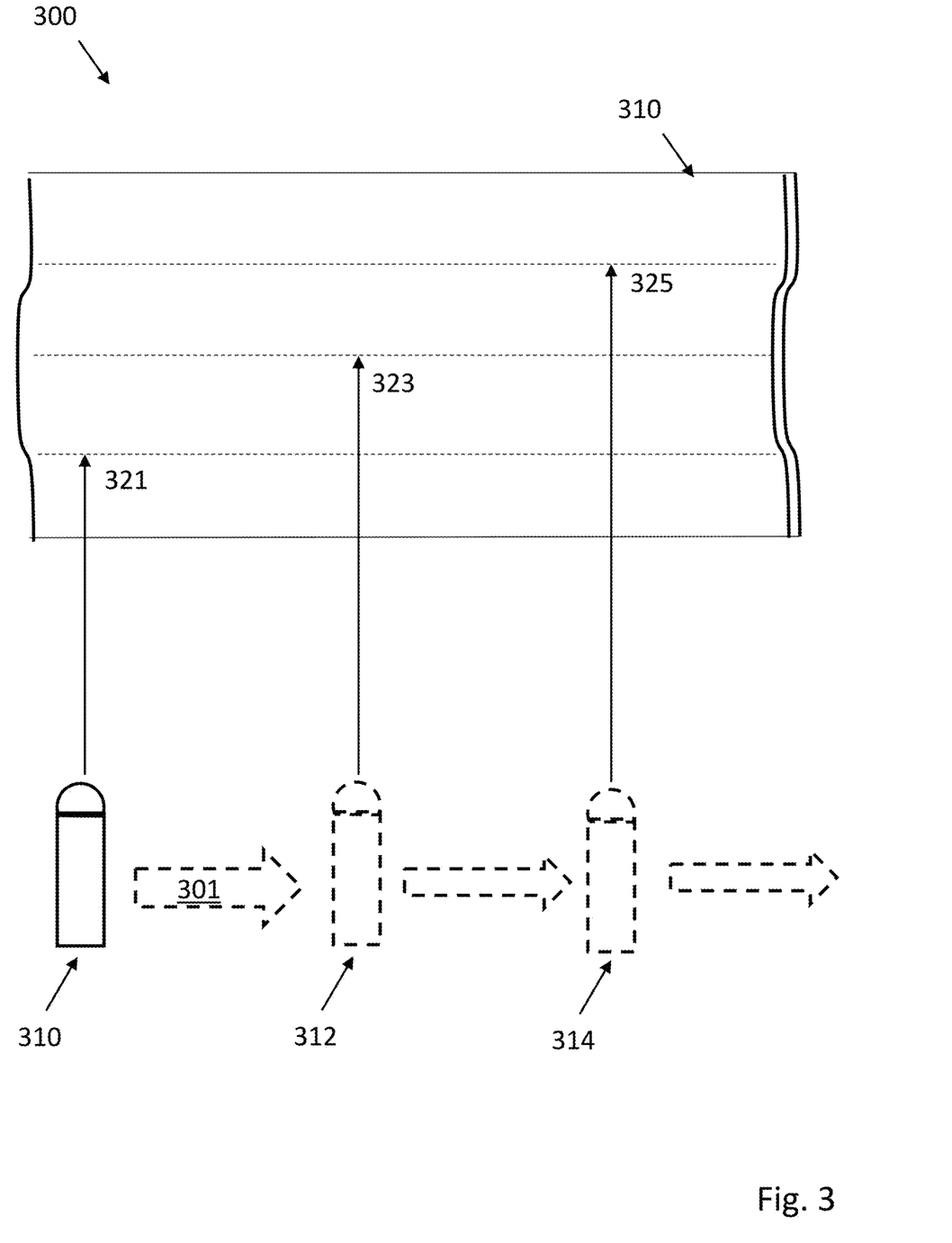
FIG. 3 illustrates movement of a camera along a shelf to capture images at different focal lengths.

This is illustrated with respect to cartoon 300 of FIG. 3, which is a top view of a shelf 310 that is photographed at three different focal lengths. A camera 310 can be moved (direction noted by arrow 301) laterally along the shelf 310 and be set to periodically capture photos at different focal lengths 321, 323, and 325.

Figure 4:
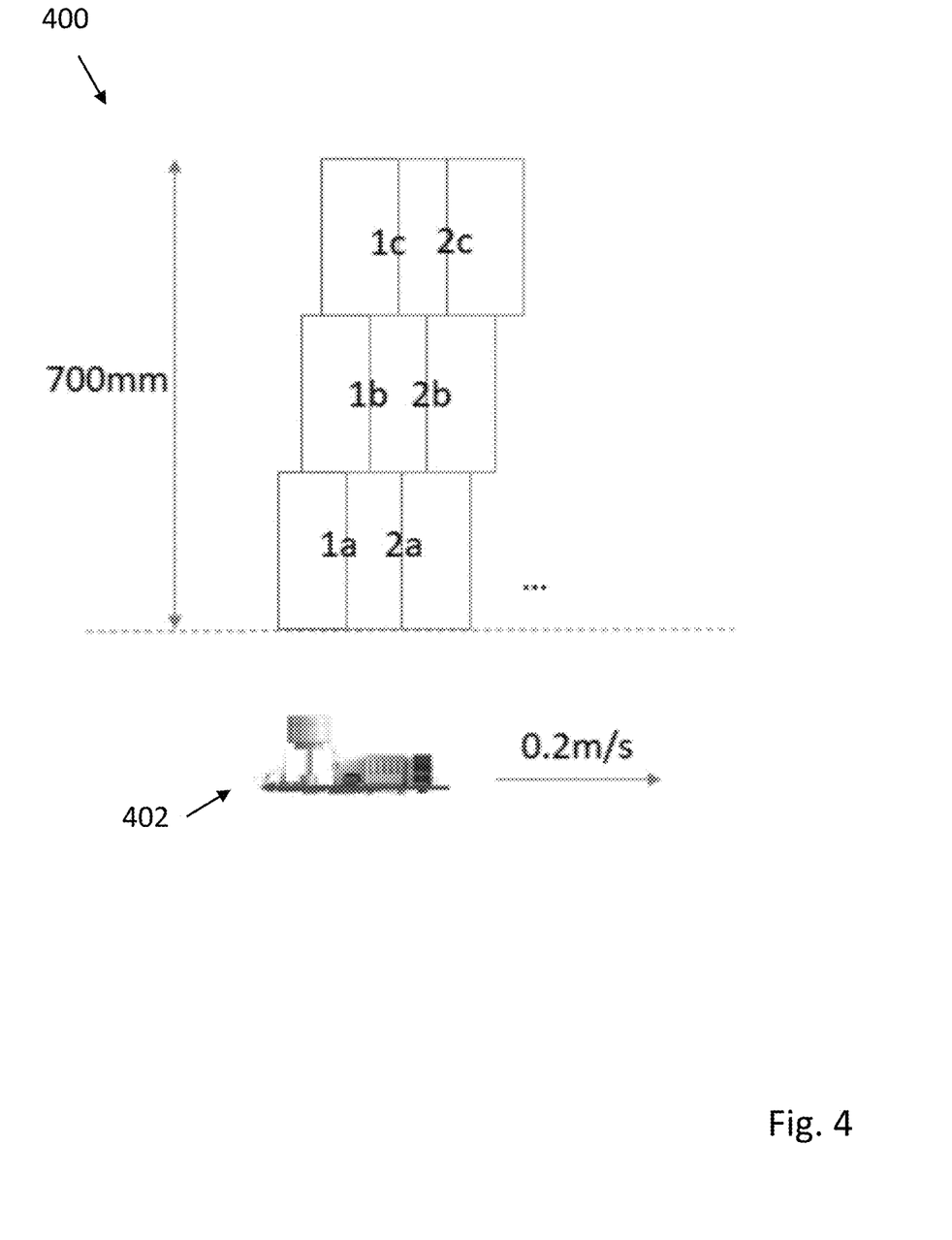
FIG. 4 is an embodiment illustrating capture of overlapping fields with a moving camera.

FIG. 4 is an embodiment 400 illustrating (in top view) capture of overlapping image fields along a length of a 700 millimeter wide shelf using a camera 402 moving at 0.2 meters per second. As illustrated, movement of the camera is slow enough to allow substantial overlap between image fields of differing focal lengths (e.g. 1A, 1B, and 1C), as well allowing for optional merger of images having the same focal length to form at least two panoramic images (e.g. 1A, 1B). As will be appreciated, a panoramic image does not necessarily have to be formed from the captured images. For example, if all barcodes and product facings in a selected section are positioned at a front edge of a shelf, panoramic images based on images 2B and 2B, or 1C and 2C can be formed.

Figure 5:
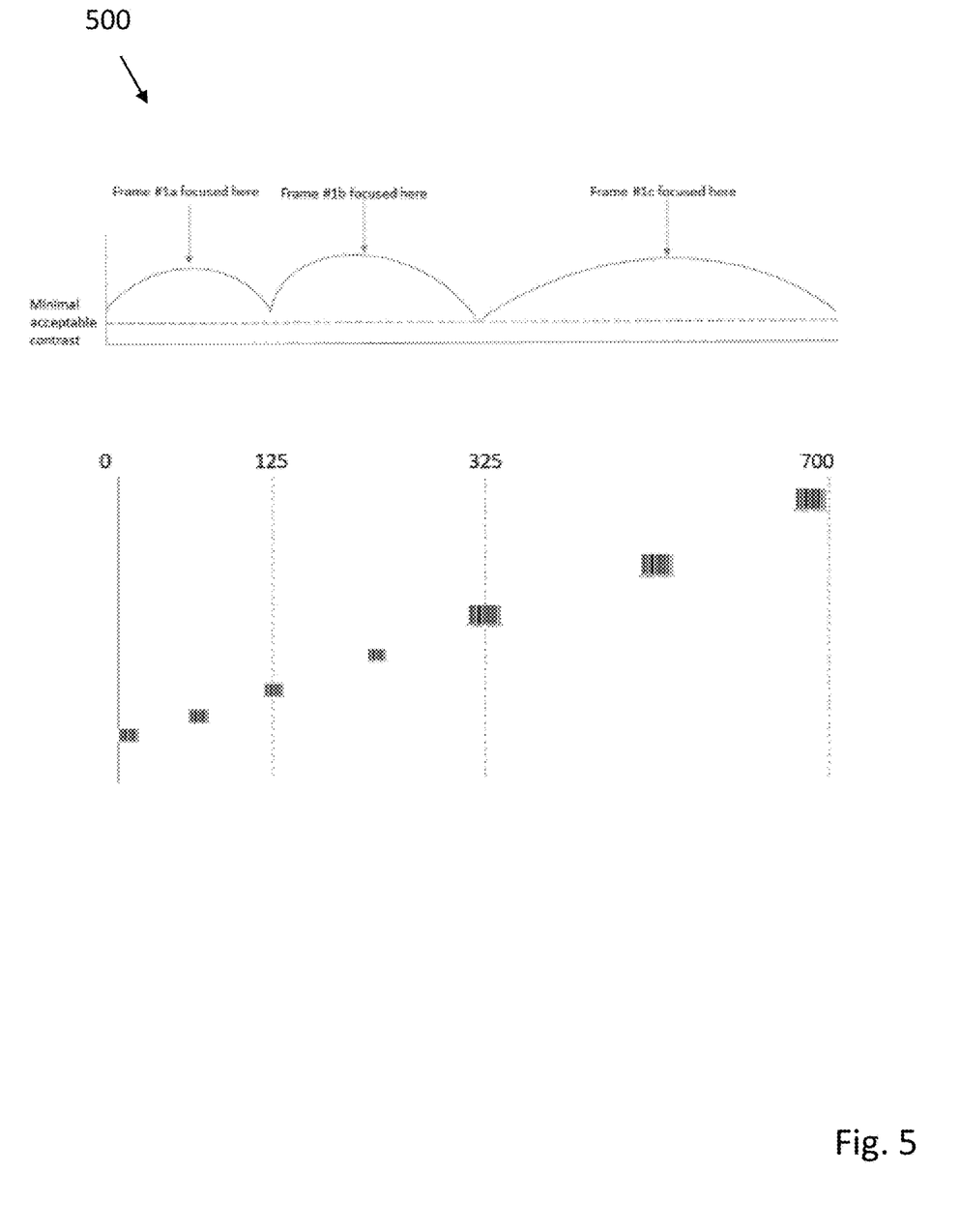
FIG. 5 is an embodiment illustrating capture of bar code information using an image with best focus.

FIG. 5 is an embodiment 500 illustrating capture of label information (e.g. a bar code) using an image with best focus. As will be understood, label information can include one or two dimensional bar codes, QR codes, text or numbering capturable by OCR technology, color or patterned symbols, pricing information, product information, or any other suitable markings or indicia related to a product. Typically, such product related indicia have a relatively small sizes, with vertical and horizontal dimensions respectively less than 5 centimeters. Image capture of bar codes or other suitable indicia can be ensured by ensuring frequency of image capture under camera displacement is large enough that consecutive images at the same focal depth overlap over a region larger than the length of the barcode, such that an entire barcode is guaranteed to be contained within a single image.

The described system may operate in several possible ways, depending on resource constraints such as bandwidth and available processing power. For example, a camera's processor may pre-process the images it captures and attempt to recognize all barcodes at a node, assign 2D coordinates to them, and send the pre-processed data along with coordinates and images from a single depth (e.g. front of the shelf) to a main processing unit that will combine images from all cameras into a single panorama (at a single depth, e.g. front of the shelf) and cross-correlate the locations of the scanned barcodes to objects in the panorama.

Alternatively, system may first send all images taken at a single depth to a main processing unit, which will combine images from all cameras into a single panorama (at a single depth, e.g. front of the shelf), and run a label detection algorithm to detect the locations of all visible labels and map them to 2D space. The system will then attempt to find these labels in the various images (captured at the various depths) that include this 2D location, select the image in which this label is most in focus, and only then run a barcode recognition algorithm on the part of the image that corresponds to this 2D location (this can be done either on the camera processor or on the main processor).

In other embodiments, an algorithm that can map between objects in a panorama view image and coordinates in 2D space can be used.

In another embodiment, given a physical location in 2D space, an algorithm can be used to scan across multiple images in which this location is visible, selecting the one in which this location is visible in the best focus, and recognizing a barcode at this location.

In another embodiment, image quality or functionality factors such as number of focus positions, speed of camera movement, frame rate of the camera, specific focus depth, captured resolution, effective ISO, amount of directed lighting, or the like can be dynamically adjusted. For example, focus position and/or frequency of image capture can be dynamically modified according to local conditions. An autonomous robot with dynamically programmable camera system can capture images at two separate focal lengths while moving along a first aisle. When the autonomous robot moves from a first aisle to a second aisle having a deeper shelf depth, images at three separate focal lengths can be captured, and movement of the autonomous robot and camera system slowed to ensure adequate image overlap at each focal length.

In another embodiment, focus depths can be adjusted using input related to shelf distance taken from depth sensing or positioning mechanisms supported by an autonomous robot.

As will be understood, the camera system and methods described herein can operate locally or in via connections to either a wired or wireless connected subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) can allow for local data storage of user-specified preferences or protocols. In one particular embodiment, multiple communication systems can be provided. For example, a direct Wi-Fi connection (802.11b/g/n) can be used as well as a separate 4G cellular connection.

Connection to remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method comprising:
moving a camera laterally alongside a shelf;
continually cycling the camera through a plurality of pre-defined focus depths, including a first focus depth and a second focus depth, capturing product information at each of the plurality of pre-defined focus depths concurrently with moving the camera laterally alongside the shelf, including:
transitioning the camera to the first focus depth;
capturing a first shelf image at a first position during the camera movement and within a first field-of-view at the first focus depth;
subsequent to capturing the first shelf image, transitioning the camera to the second focus depth;
capturing a second shelf image at a second position and within a second field-of-view at the second focus depth;
identifying an overlap region between the first field-of-view and the second field-of-view;
reading label content of a product label or decoding a barcode in the overlap region at the first focus depth;
reading the label content of the product label or decoding the barcode in the overlap region at the second focus depth; and
determining that the label content or the barcode is in better focus in the first shelf image relative to the second shelf image; and
reporting the label content or the barcode from the first shelf image.

2. The method of claim 1, further comprising further moving the camera laterally alongside the shelf;
wherein transitioning the camera to a second focus depth comprises transitioning the camera to the second focus depth during the further camera movement; and
wherein capturing a second shelf image at a second position comprises capturing the second shelf image at the second position during the further camera movement.

3. The method of claim 1, further comprising:
subsequent to capturing the second shelf image, additionally moving the camera laterally alongside the shelf at a specified speed;
capturing another shelf image during the additional camera movement within a third field-of-view at the first focus depth, the third field-of-view at least partially overlapping with the first field-of-view;
merging the first shelf image and the other shelf image into a first panoramic image;
subsequent to capturing the other shelf image, even further moving the camera laterally alongside the shelf at the specified speed;
capturing a further shelf image during the even further camera movement and within a fourth field-of-view at the second focus depth; and merging the second shelf image and the further shelf image into a second panoramic image.

4. The method of claim 3, further comprising stacking the first panoramic image and the second panoramic image into a focus stacked image; and
wherein reporting the label content or the barcode from the first shelf image comprises reporting the label content or the barcode from the focus stacked image.

5. The method of claim 1, further comprising stacking the first shelf image and the second shelf image into a focus stacked image.

6. The method of claim 5, wherein reporting the label content or the barcode comprises reporting the label content or the barcode from the focus stacked image.

7. The method of claim 1, wherein moving a camera laterally alongside a shelf comprises moving the camera laterally alongside the shelf at a specified speed;
wherein capturing a first shelf image comprises capturing the first shelf image in accordance with a capture frequency at the first position;
wherein further moving the camera laterally comprises further moving the camera laterally alongside the shelf at the specified speed; and
wherein capturing a second shelf image comprises capturing the second shelf image in accordance with the capture frequency at the second position, wherein the second position differs from the first location.

8. A method comprising:
moving a camera laterally alongside a shelf;
continually cycling the camera through a plurality of pre-defined focus depths, including a first focus depth and a second focus depth, capturing product information at each of the plurality of pre-defined focus depths concurrently with moving the camera laterally alongside the shelf, including:
transitioning the camera to the first focus depth;
capturing a first shelf image at a first position during the camera movement and at the first focus depth within a first field-of-view;
subsequent to capturing the first shelf image, transitioning the camera to a second focus depth;
capturing a second shelf image at a second position and at the second focus depth with a second field-of-view;
identifying a two-dimensional (2D) overlap region between the first field-of-view and the second field-of-view in a space;
reading label content of a product label or decoding a barcode in the two-dimensional (2D) overlap region at the first focus depth;
reading the label content of the product label or decoding the barcode in the two-dimensional (2D) overlap region at the second focus depth; and
determining that the label content or the barcode is in better focus in the first shelf image relative to the second shelf image; and
reporting the label content or the barcode from the first shelf image.

9. The method of claim 8, further comprising further moving the camera laterally alongside the shelf;
wherein transitioning the camera to a second focus depth comprises transitioning the camera to the second focus depth during the further camera movement; and
wherein capturing a second shelf image at a second position comprises capturing the second shelf image at the second position during the further camera movement.

10. The method of claim 8, wherein moving a camera laterally alongside a shelf comprises moving the camera laterally alongside the shelf at a specified speed; and wherein further moving the camera laterally comprises further moving the camera laterally alongside the shelf at the specified speed.

11. The method of claim 10, wherein capturing a first shelf image comprises capturing the first shelf image in accordance with a capture frequency; and wherein capturing a second shelf image comprises capturing the second shelf image in accordance with the capture frequency.

12. The method of claim 8, further comprising stacking the first shelf image and the second shelf image into a focus stacked image.

13. The method of claim 12, wherein reporting the label content or the barcode comprises reporting the label content or the barcode from the focus stacked image.

14. The method of claim 8, wherein transitioning the camera to a second focus depth comprises adjusting between the first focus depth and the second focus depth based on shelf distance data provided by a depth sensing system.

15. A system comprising:

an autonomous robot including an attached camera system capable of capturing images at a first focus depth and at a second focus depth;

a processor; and system memory coupled to the processor and storing instructions configured to cause the processor to:

move the autonomous robot laterally alongside a shelf;

continually cycle the camera through a plurality of pre-defined focus depths, including a first focus depth and a second focus depth, capturing product information at each of the plurality of pre-defined focus depths concurrently with moving the camera laterally alongside the shelf, including:

transition the camera to the first focus depth;

capture a first shelf image with the camera system at a first position during the autonomous robot movement and within a first field-of-view at the first focus depth;

further move the autonomous robot laterally alongside the shelf;

subsequent to capturing the first shelf image, transition the camera to the second focus depth during the further autonomous robot movement;

capture a second shelf image with the camera system at a second position during the further autonomous robot movement and within a second field-of-view at the second focus depth;

identify an overlap region between the first field-of-view and the second field-of-view;

read label content of a product label or decoding a barcode in the overlap region at the first focus depth;

read the label content of the product label or decoding the barcode in the overlap region at the second focus depth; and determine that the label content or the barcode is in better focus in the first shelf image relative to the second shelf image; and report the label content or the barcode from the first shelf image.

16. The system of claim 15, wherein instructions configured to move the autonomous robot laterally alongside a shelf comprises instructions configured to move the autonomous robot laterally alongside the shelf at a specified speed; and wherein instructions configured to further move the autonomous robot laterally alongside a shelf comprise instructions configured to further move the autonomous robot laterally alongside the shelf at the specified speed.

17. The system of claim 16, wherein instructions configured to capture a first shelf image comprise instructions configured to capture the first shelf image in accordance with a capture frequency; and wherein instructions configured to capture a second shelf image comprise instructions configured to capture the second shelf image in accordance with the capture frequency.

18. The system of claim 15, further comprising instructions configured to stack the first shelf image and the second shelf image into a focus stacked image.

19. The system of claim 18, wherein instructions configured to report the label content or the barcode from the first shelf image comprise instructions configured to report the label content or the barcode from the focus stacked image.

20. The method of claim 1, wherein transitioning the camera to the second focus depth comprises adjusting the camera from the first focus depth to the second focus depth based on shelf distance data received from a depth sensing system.

* * * * *